United States Patent Office
3,475,387
Patented Oct. 28, 1969

3,475,387
MANUFACTURE OF POLYAMIDES FROM AROMATIC DICARBOXYLIC ACIDS
John Anthony Carter, Goytre, near Pontypool, and Geoffrey James Tyler, Llantarnam, Cwmbran, England, assignors to British Nylon Spinners Limited, Pontypool, England
No Drawing. Continuation of application Ser. No. 390,226, Aug. 17, 1964. This application Dec. 8, 1967, Ser. No. 689,204
Claims priority, application Great Britain, Aug. 31, 1963, 34,504/63
Int. Cl. C08g 20/04, 20/20
U.S. Cl. 260—78     5 Claims

ABSTRACT OF THE DISCLOSURE

Polyamide forming reactants are polymerized by pumping a mixture of water and monomer through a long tube of diameter at least 3.5 cm. under polymerization temperatures. Pressure decreases continuously from at least 14 atmospheres at the entrance end to at most substantially atmospheric pressure at the exit.

The monomers are diammonium dicarboxylate salts of diamines having the formula $H_2NCH_2XCH_2NH_2$ with acids of the formula HOOCYCOOH or aminocarboxylic acids of the formula $H_2NCH_2ZCOOH$ where X, Y and Z are chains of methylene groups containing meta and/or para phenylene groups.

---

This is a continuation of prior U.S. application Ser. No. 390,226, filed Aug. 17, 1964, now abandoned.

The present invention relates to the manufacture of high molecular weight linear arylpolyamides by the condensation polymerisation of monomers which are diammonium salts of dicarboxylic acids or which are amino carboxylic acids, and more particularly to a continuous process for carrying out said polymerisation.

The expression "high molecular weight linear polyamides" is intended to signify that the degree of polymerisation of the polyamides is sufficiently great for them to be capable of being melt-spun into filaments. Moreover the term "polyamide" includes both homopolyamides and interpolyamides.

There is described in British patent specification No. 924,630 a process wherein the condensation polymerisation of aliphatic polyamides can be successfully accomplished in one stage or nearly in one stage in a long narrow tube heated to polymerisation temperatures wherein the pressure is superatmospheric, amounting to at least 14 atmospheres at the entry end thereof, and continuously decreases along the tube until at the exit end thereof it becomes substantially atmospheric or sub-atmospheric, the pressure always being low enough to permit the evolution of steam at the existing temperature. The word "continuously" means that there is no abrupt or sudden fall in pressure along the tube, the value of the pressure at any point in the tube constituting a continuous monotonic single-value function of the distance of said point along the tube.

Whilst aliphatic polyamides such as those described in the above-mentioned specification, e.g., of polyhexamethylene adipamide are of great commercial importance on account of their properties which make them eminently useful in textile and other fields, much investigation has nevertheless been carried out in order to improve the said properties. In particular the effect of introducing arylene links into the linear polyamide chain has been variously tried; by this means a relatively high initial modulus (i.e. Young's modulus at, say 2% extension) is sometimes obtained. Speaking generally, however, it can be said that arylpolyamides (by which is to be understood polyamides containing arylene links) are often found to possess a very high melting point. The latter may make the processes of polymerisation and/or melt-spinning difficult or impossible and the continuous polymerisation of many arylpolyamides could certainly not be effected by the above-mentioned narrow tube process of British patent specification No. 924,630 because it is necessary that the polyamide in the aforesaid process should melt at a practically attainable temperature at which more-over the polyamide evinces little or no tendency to decompose.

Contrary to expectation most extensive experimental work has now demonstrated that many arylpolyamides can indeed be successfully manufactured in accordance with the narrow tube process of British patent specification No. 924,630 providing particular care is taken in choosing the chemical structure of the monomer, which in turn determines the structure of the repeating unit of the resulting arylpolyamide. Certain chemical groupings must be avoided since they lead to too high a melting-point and/or the decomposition of the polyamide. Since the continuous polymerisation process of British patent specification No. 924,630 is most attractive economically, the possibility of extending it to arylpolyamides constitutes an important technical advance.

In the present process for the manufacture of high molecular weight linear arylpolyamides the monomer employed is defined as being a diammonium dicarboxylate salt derived from a diamine of formula $NH_2X—NH_2$ and a dicarboxylic acid of formula HOOC—Y—COOH or an aminocarboxylic acid of formula $NH_2$—Z—COOH, X designating a chain of p methylene groups containing, not joined directly to nitrogen, q m- or p-phenylene links, Y a chain of r methylene groups containing s m- or p-phenylene links and Z a chain of t methylene groups containing, not joined directly to nitrogen, u m- or p-phenylene links, wherein p, q, r, s, t and u are positive integers, q and s being the same or different are each zero, 1 or 2 but either q or s is at last 1, u is 1 or 2, p is at least 6 if q is zero, but at least 2 if q is not zero, r is at least 4 if s is zero, the sum of p and r is at least 6 and t is at least 3, X, Y, and Z optionally bearing alkyl substituents and optionally containing —O— links in the chain, providing the groupings —O—O—, —O—CH$_2$—N= and

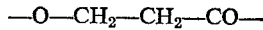

be absent.

Accordingly the present invention consists of a continuous process for the manufacture of high molecular weight linear polyamides by the condensation polymerisation of a monomer which is a diammonium dicarboxylate salt derived from a diamine of formula $NH_2$—X—$NH_2$ and a dicarboxylic acid of formula HOOC—Y—COOH or which is an aminocarboxylic acid of formula $$NH_2—Z—COOH$$

X designating a chain of p methylene groups containing, not joined directly to nitrogen, q m- or p-phenylene links, Y a chain of r methylene groups containing s m- or p-phenylene links and Z a chain of t methylene groups containing, or joined directly to nitrogen, u m- or p-phenylene links, wherein p, q, r, s, t and u are positive integers, q and s being the same or different are each zero, 1 or 2 but either q or s is at least 1, u is 1 or 2, p is at least 6 if q is zero but at least 2 if q is not zero, r is at least 4 if s is zero, the sum of p and r is at least 6 and t is at least 3, X, Y and Z optionally bearing alkyl substituents and optionally containing —O— links in the chain, providing the groupings —O—O—, —O—CH$_2$—N= and

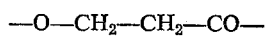

be absent, comprising pumping a mixture of water and said monomer into the entry end of a long narrow tube heated to polymerisation temperatures so that the material polymerises as it passes through the tube, wherein the pressure is at least 14 atmospheres at the entry end of said tube, continuously decreases along the tube and falls to substantially atmospheric or sub-atmospheric pressure at the exit end of said tube but always permits the evolution of steam which is derived from the water pumped into the tube or the water of condensation, and at any point in the tube has value constituting a continuous monotonic single-value function of the distance of said point along the tube, the rate of passage of the polymerising material through the tube being such that at least 90% of the total theoretical water of chemical condensation is evolved during said passage, and optionally further heating the material issuing from the exit end of the tube to complete the polymerisation of the polyamide.

The invention includes melt-spinning the above polyamides into filaments, films, ribbons and like shaped objects and the said objects when so melt-spun.

Especially preferred are continuous processes for the manufacture of high molecular weight linear polyamides in accordance with the present invention wherein the dicarboxylic acid is terephthalic acid, isophthalic acid or p-di-(beta-carboxyethyl)-benzene and/or the diamine is one of the following:

p-Xylylene diamine
m-Xylylene diamine
2,5-di(beta-aminoethyl)-p-xylene
Di-(beta-aminoethyl) durene
m-Di(beta-aminoethyl) benzene
p-Methyl-m-xylylene diamine
Di-(aminomethyl) mesitylene
Di-(aminoethyl) mesitylene
1,3-dimethyl-4,6-xylylene diamine By the phrase "narrow tube" is to be understood a tube having an internal diameter not exceeding 3.5 cm. and preferably not exceeding 2.5 cm. The diameter of the tube need not be uniform; it can increase from the inlet towards the outlet. For example the diameter may increase from 7 mm. to 23 mm. Moreover the tube may possess any convenient shape, e.g. a helix positioned vertically or horizontally. The vertical helix can be traversed by the polymerising mass in an upward or downward direction. The material of which the tube is constructed is conveniently one not subject to corrosion by the polymerising mass and may be, for instance, stainless steel. The tube must be capable of withstanding a high pressure which may, for example reach 28 atmospheres at the entry end. The other tube or vessel into which the aforesaid narrow tube leads, can take the form of a tube of larger internal diameter or else may constitute a vessel in which the molten polymer collects under atmospheric pressure, and from which it is melt-spun into filaments or drawn off for use as required. In cases in which the other tube or vessel takes the form of a tube of larger internal diameter the narrow tube may conveniently be joined thereto by an intermediate tube of gradually increasing diameter. The expression "substantially atmospheric" signifies that the pressure in question need not correspond precisely with that of the atmosphere but may differ therefrom by a small amount such as that due to a water seal or column of liquid reagent, for instance. Such small pressure differences can be assumed to be of the order of a few percent of an atmosphere. It will be apparent from the conditions of temperature and pressure just prescribed that steam is always present as a separate phase during the polymerisation in the tube. The steam is derived from the water of the aqueous monomer solution or suspension and from the water evolved in the condensation polymerisation reaction.

For making a given polyamide it is found in practice that a temperature at least 10° C. above the melting point of the polyamide can be regarded as a suitable polymerisation temperature i.e. a temperature at which amide-formation proceeds at a useful rate, provided it be not too high otherwise degradation of the polyamide is likely to occur. The temperature of the polymerising material is preferably not allowed to fall as it passes through the narrow tube. It is convenient that the whole tube be surrounded by heating means e.g. a jacket of hot fluid, at one uniform temperature. The temperature is advantageously from 275° C. to 300° C.

The rate of pumping should be adjusted so that the polymerising material is submitted to polymerising temperatures for a period of at least 5 minutes and preferably from 30 to 60 minutes. The pressure at the entry end of the tube is preferably between 20 and 34 atmospheres. All pressures quoted are absolute.

Examples of suitable monomers for use in the present process are the following diammonium dicarboxylate salts from the following pairs of diamines and dicarboxylic acids:

| | |
|---|---|
| Diamine | Gamma-(p-gamma-amino-n-propylphenyl)-n-propylamine. |
| Acid | Sebacic acid. |
| Diamine | 2,5-di(beta-aminoethyl)-p-xylene. |
| Acid | Pimelic acid. |
| Diamine | Di-(beta-aminoethyl) durene. |
| Acid | 1,16-hexadecane dicarboxylic acid. |
| Diamine | p-Di-(aminomethyl)benzene. |
| Acid | Di-(delta-carboxy-n-butyl) oxide. |
| Diamine | Beta-(p-aminomethylphenyl) ethylamine. |
| Acid | Adipic acid. |
| Diamine | Gamma-(p-beta-aminoethylphenyl)-n-propylamine. |
| Acid | Adipic acid. |
| Diamine | Delta-(p-beta-aminoethylphenyl)-n-butylamine. |
| Acid | Adipic acid. |
| Diamine | m-Xylylene diamine. |
| Acid | Azelaic acid. |
| Diamine | m-Di-(beta-aminoethyl) benzene. |
| Acid | Adipic acid. |
| Diamine | m-Di-(beta-aminoethyl) benzene. |
| Acid | Sebacic acid. |
| Diamine | Di-(aminomethyl) mesitylene. |
| Acid | Azelaic acid. |
| Diamine | 1,5-di(aminomethyl)-2,4-xylene. |
| Acid | Azelaic acid. |
| Diamine | Di-(aminomethylphenyl)methane. |
| Acid | Sebacic acid. |
| Diamine | Decamethylene diamine. |
| Acid | Di-p-(beta-carboxyethylphenyl)methane. |
| Diamine | Hexamethylene diamine. |
| Acid | Di-p-(gamma-carboxypropyl)-phenyl oxide. |
| Diamine | Decamethylene diamine. |
| Acid | p-Di-(carboxymethoxy) benzene. |
| Diamine | Hexamethylene diamine. |
| Acid | Di-(p-carboxymethoxyphenyl) methane. |
| Diamine | Hexamethylene diamine. |
| Acid | 1,2-di-(p-carboxymethoxyphenyl) ethane. |
| Diamine | Octadecamethylene diamine. |
| Acid | Terephthalic acid. |

| | |
|---|---|
| Diamine | Di-epsilon-amino-n-amyl oxide. |
| Acid | Terephthalic acid. |

| | |
|---|---|
| Diamine | 1,10-diamino-4,7-dioxadecane. |
| Acid | Terephthalic acid. |

| | |
|---|---|
| Diamine | 3-ethyl-hexamethylene diamine. |
| Acid | Terephthalic acid. |

| | |
|---|---|
| Diamine | 2,3-dimethylhexamethylene diamine. |
| Acid | Terephthalic acid. |

| | |
|---|---|
| Diamine | Heptamethylene diamine. |
| Acid | p-Di-(beta-carboxyethyl)benzene. |

| | |
|---|---|
| Diamine | Decamethylene diamine. |
| Acid | 2,5-di-(beta-carboxyethyl)-p-xylene. |

| | |
|---|---|
| Diamine | Decamethylene diamine. |
| Acid | p-Di-(beta-carboxyethyl)benzene. |

| | |
|---|---|
| Diamine | Hexamethylene diamine. |
| Acid | p-(Beta-carboxyethyl)phenyl acetic acid. |

| | |
|---|---|
| Diamine | Decamethylene diamine. |
| Acid | Di-(carboxymethyl)mesitylene. |

| | |
|---|---|
| Diamine | Di-gamma-amino-n-propyl oxide. |
| Acid | Di-(m-carboxyphenyl) methane. |

| | |
|---|---|
| Diamine | 2,5-di(beta-aminoethyl)-p-xylene. |
| Acid | Sebacic acid. |

| | |
|---|---|
| Diamine | p-Di(gamma-amino-n-propyl)benzene. |
| Acid | Adipic acid. |

| | |
|---|---|
| Diamine | 1-aminomethyl-4-gamma-amino-n-propyl benzene. |
| Acid | Adipic acid. |

| | |
|---|---|
| Diamine | m-Xylylene diamine. |
| Acid | Adipic acid. |

| | |
|---|---|
| Diamine | Di-(beta-aminoethyl)mesitylene. |
| Acid | Adipic acid. |

| | |
|---|---|
| Diamine | Beta-(m-aminomethylphenyl)ethylamine. |
| Acid | Adipic acid. |

| | |
|---|---|
| Diamine | p-Di-(gamma-amino-n-propoxy)benzene. |
| Acid | Adipic acid. |

| | |
|---|---|
| Diamine | Di-(beta-aminoethylphenyl)methane. |
| Acid | Sebacic acid. |

| | |
|---|---|
| Diamine | Decamethylene diamine. |
| Acid | 1,2-di-p-beta-carboxyethylphenyl-ethane. |

| | |
|---|---|
| Diamine | Hexamethylene diamine. |
| Acid | Di-(p-carboxymethylphenyl) oxide. |

| | |
|---|---|
| Diamine | Hexamethylene diamine. |
| Acid | Di-(p-carboxymethoxyphenyl) oxide. |

| | |
|---|---|
| Diamine | Hexamethylene diamine. |
| Acid | Beta-(p-carboxymethoxyphenyl)-propionic acid. |

| | |
|---|---|
| Diamine | Hexamethylene diamine. |
| Acid | p-Di-(carboxymethoxy)benzene. |

| | |
|---|---|
| Diamine | Decamethylene diamine. |
| Acid | 1,2-di-(p-carboxymethoxyphenyl)ethane. |

| | |
|---|---|
| Diamine | Nonamethylene diamine. |
| Acid | Terephthalic acid. |

| | |
|---|---|
| Diamine | Dodecamethylene diamine. |
| Acid | Terephthalic acid. |

| | |
|---|---|
| Diamine | 1,6-diamino-3-methyl-n-hexane. |
| Acid | Terephthalic acid. |

| | |
|---|---|
| Diamine | Hexamethylene diamine. |
| Acid | p-Di-(beta-carboxyethyl)benzene. |

| | |
|---|---|
| Diamine | Hexamethylene diamine. |
| Acid | p-Di-(gamma-carboxy-n-propyl)benzene. |

| | |
|---|---|
| Diamine | Hexamethylene diamine. |
| Acid | p-(Gamma-carboxy-n-propyl) phenylacetic acid. |

| | |
|---|---|
| Diamine | Hexamethylene diamine. |
| Acid | Isophthalic acid. |

| | |
|---|---|
| Diamine | Hexamethylene diamine. |
| Acid | Di-(m-carboxyphenyl)methane. |

| | |
|---|---|
| Diamine | p-Di-(gamma-amino-n-propyl)benzene. |
| Acid | p-Di-(beta-carboxyethyl)benzene. |

| | |
|---|---|
| Diamine | p-Di(gamma-amino-n-propyl)benzene. |
| Acid | p-Di(carboxymethyl)benzene. |

Amino-carboxylic acids:

p-(Gamma-amino-n-propyl)phenoxyacetic acid
1-p-(gamma-carboxy-n-propyl)phenyl-2-aminoethane
p-(Gamma-carboxy-n-propyl)phenylmethylamine
p-(Delta-carboxy-n-butyl)phenylmethylamine
p-(Beta-aminoethyl)phenylacetic acid
Omega-p-(beta-aminoethyl)phenyl-n-valeric acid.

By employing a mixture of monomers in the above process interpolyamides may be made. Thus a mixture of diammonium dicarboxylate salts derived from hexamethylene diamine on the one hand and both adipic and terephthalic acids on the other can be employed for example. Or else there may be polymerised in conjunction with one of the present monomers, e.g. one of those listed above another polyamide-yielding monomer, e.g. one of the following diammonium dicarboxylate salts or amino acids:
Hexamethylene diammonium adipate
Hexamethylene diammonium sebacate
Octamethylene diammonium adipate
Decamethylene diammonium adipate
Pentamethylene diammonium sebacate
Dodecamethylene diammonium adipate
Epsilon-amino caproic acid
Omega-amino undecanoic acid
Hexamethylene diammonium azelate
Dodecamethylene diammonium suberate.

Further examples of interpolyamides are those obtained by pumping into the present narrow tube the following mixtures of monomers.

| No. | Mixture of monomers | Mol. percent |
|---|---|---|
| 1 | Salt from hexamethylene diamine and p-di-(beta-carboxyethyl) benzene. | 60 |
|  | Salt from hexamethylene diamine and beta-(p-carboxymethylphenyl) propionic acid. | 40 |
| 2 | Salt from hexamethylene diamine and p-di-(beta-carboxyethyl) benzene. | 10 |
|  | Salt from hexamethylene diamine and beta-(p-carboxymethylphenyl) propionic acid. | 90 |
| 3 | Salt from hexamethylene diamine and p-di-(beta-carboxyethyl) benzene. | 60 |
|  | Salt from hexamethylene diamine and sebacic acid. | 40 |
| 4 | Salt from hexamethylene diamine and p-di-(beta-carboxyethyl) benzene. | 60 |
|  | Salt from hexamethylene diamine and p-(gamma-carboxy-n-propyl) phenylacetic acid. | 40 |
| 5 | Salt from hexamethylene diamine and p-di-(beta-carboxyethyl) benzene. | 60 |
|  | Salt from hexamethylene diamine and p-di-(carboxymethoxy) benzene. | 40 |
| 6 | Salt from nonamethylene diamine and terephthalic acid. | 80 |

| No. | Mixture of monomers | Mol. percent |
| --- | --- | --- |
| | Salt from hexamethylene diamine and adipic acid | 20 |
| 7 | Salt from nonamethylene diamine and terephthalic acid. | 60 |
| | Salt from nonamethylene diamine and adipic acid | 40 |
| 8 | Salt from hexamethylene diamine and p-di-(beta-carboxyethyl) benzene. | 77 |
| | Amino acid: epsilon-aminocaproic acid | 23 |
| 9 | Salt from hexamethylene diamine and terephthalic acid. | 60 |
| | Amino acid: epsilon-aminocaproic acid | 40 |
| 10 | Salt from hexamethylene diamine and isophthalic acid. | 60 |
| | Salt from hexamethylene diamine and terephthalic acid. | 40 |
| 11 | Salt from 2-methylhexamethylene diamine and terephthalic acid. | 50 |
| | Salt from 3-methylhexamethylene diamine and terephthalic acid. | 50 |
| 12 | Salt from decamethylene diamine terephthalic acid | 80 |
| | Salt from hexamethylene diamine sebacic acid | 20 |
| 13 | Salt from m-xylylene diamine azelaic acid | 50 |
| | Salt from p-xylylene diamine azelaic acid | 50 |
| 14 | Salt from p-xylylene diamine sebacic acid | 60 |
| | Salt from hexamethylene diamine sebacic acid | 40 |
| 15 | Salt from decamethylene diamine sebacic acid | 25 |
| | Salt from decamethylene diamine terephthalic acid | 75 |
| 16 | Salt from p-xylylene diamine adipic acid | 60 |
| | Amino acid: epsilon-aminocaproic acid | 40 |
| 17 | Salt from p-di-(beta-aminoethyl) benzene adipic acid | 70 |
| | Amino acid: epsilon-aminocaproic acid | 30 |
| 18 | Salt from p-di-(beta-aminoethyl) benzene adipic acid | 75 |
| | Salt from hexamethylene diamine sebacic acid | 25 |
| 19 | Salt from di-gamma-amino-n-propyl oxide adipic acid | 25 |
| | Salt from di-gamma-amino-n-propyl oxide terephthalic acid. | 75 |
| 20 | Salt from hexamethylene diamine adipic acid | 25 |
| | Salt from di-gamma-amino-n-propyl oxide terephthalic acid. | 75 |
| 21 | Salt from hexamethylene diamine adipic acid | 86 |
| | Salt from hexamethylene diamine isophthalic acid | 14 |
| 22 | Salt from hexamethylene diamine adipic acid | 86½ |
| | Salt from m-xylylene diamine adipic acid | 13½ |

The necessary fall of pressure along the narrow tube is effected by an appropriate release of steam at the exit end thereof. The degree of polymerisation attained by the polyamide issuing from the narrow tube depends especially though not solely on the temperature and time of passage through the tube and should correspond to the elimination of at least 90% of the total theoretical water of chemical condensation, in which case the polyamide can be directly melt-spun into filaments. If desired, however, the degree of polymerisation of the polyamide issuing from the narrow tube can be increased by further heating in one or more other vessels maintained at polymerisation temperatures.

Conventional processes for the melt-spinning of polyamides are normally effected at a temperature of about 240–300° C. Higher temperatures are inconvenient both from an engineering point of view and because they are apt to cause the polyamide to become degraded by oxidation and/or decomposition. Whilst many of the present homopolyamides melt at a very convenient temperature, it is to be noted that the interpolyamides in general melt at a lower temperature than do homopolyamides. Moreover in the case of a homopolyamide, the melting point of which is on the high side, it is always possible to lower the melting point by the admixture of a suitable plasticiser. Such plasticisers should be devoid of halogen and must contain no ester grouping. Examples of plasticisers that may usefully be employed are phenols, medium and high boiling glycols and sulphonamides, for instance:

1,12-di(p-hydroxyphenyl)-octadecane
1,8-di(p-hydroxyphenyl)-octadecane
2,8-di(p-hydroxyphenyl)-nonane
1,10-di(hydroxyphenyl)-decane
2,15-di(p-hydroxyphenyl)-hexadecane
Hexamethylene glycol
2-ethylhexane diol-1,3
3-methylhexane diol-1,6
3-methoxy-3-ethylhexane diol-1,6
2-ethyl-4-ethoxypentane diol-1,5
N-ethyl-o-toluene sulphonamide
N-butyl-p-toluene sulphonamide
N-phenylcyclohexane sulphonamide
N-diamyl-p-toluene sulphonamide.

In the present process of manufacture of polyamides there may be included in the reaction mixture monofunctional compounds in small quantity, notably monoamines or monobasic acids, e.g. acetic acid, in order to prevent polymerisation proceeding beyond the desired degree at elevated temperatures, for example, when the polyamide is held molten for the purpose of melt-spinning. Such monofunctional compounds are known as viscosity stabilisers. The extent to which polymerisation proceeds can also be controlled by adding to the reaction mixture a small amount of a difunctional compound e.g. adipic acid. Other adjuvants, besides the plasticisers, referred to above, may also be added at any convenient stage of the process, for instance: dyes, pigments, dyestuff formers, heat stabilisers, light stabilisers, delustrants, polyamide and other resins.

The following examples, in which the parts and the percentages are by weight, are intended to illustrate, not limit, the invention:

EXAMPLE 1

A mixture of 40 parts of the salt derived from 2,5-di-(beta-aminoethyl)-p-xylene and sebacic acid and 60 parts of water, to which has been added 0.6 part of 2,5-di(beta-aminoethyl)-p-xylene (i.e. free diamine) and 0.08 part of glacial acetic acid, is pumped at a rate of 10 grams per minute into a narrow coiled tube fabricated from austenitic steel and comprising 18 metres of internal diameter 2.3 mm. followed by ½ metre of internal diameter 4 mm. and 7 metres of internal diameter 7 mm.

The narrow coiled tube is maintained at 290° C. by a jacket containing the vapours of the eutectic mixture of diphenyl and diphenyl oxide and the pressure at the inlet end is 22 atmospheres. The exit end of the coiled tube discharges a mixture of molten polyamide and vapours under atmospheric pressure. The polyamide is allowed to drip into cold water and solidify.

The inherent viscosity (as defined below) of the polyamide is 0.64.

The inherent viscosity of the polyamide is defined as twice the natural logarithm of the quotient of the viscosity of a ½% (weight of polyamide by volume of solution) solution of the polyamide in a solvent consisting of a 90% (weight of a phenol by weight of solution) aqueous solution of phenol at 25° C. divided by the viscosity of the aforesaid solvent at the same temperature.

The polyamide is moulded into a rod which is melt-spun at 275° C. into a 5-filament yarn of 180 total denier. The yarn is drawn to 5½ times its original length over a pin heated to 110°. The resulting yarn has a tenacity of 6.9 grams per denier, an extensibility of 12% and an initial modulus of 62 grams per denier per 100% extension.

EXAMPLE 2

A mixture of 40 parts of the salt derived from p-di-(gamma-amino-n-propyl) benzene and adipic acid and 60 parts of water, to which has been added 0.5 part of p-di(gamma-amino-n-propyl) benzene, is pumped at a rate of 10 grams per minute into the narrow coiled tube described in Example 1. The latter is maintained at 280° C., and the pressure at the inlet end is 21 atmospheres. The resulting polyamide has an inherent viscosity of 0.78. It is melt-spun at 240° C. into a 5-filament yarn of total denier 180, which is drawn to 5.6 times its original length. The resulting yarn has a tenacity of 3.8 grams per denier and an extensibility of 46%.

EXAMPLE 3

A mixture of 40 parts of the salt derived from 1-amino-methyl-4-gamma-amino-n-propylbenzene and adipic acid and 60 parts of water, to which has been added 0.7 part of 1-aminomethyl-4-gamma-amino-n-propylbenzene and 0.08 part of glacial acetic acid is pumped at a rate of 10 grams per minute into the narrow coiled tube described in Example 1. The latter is maintained at 290° C. and the pressure at its inlet end is 23 atmospheres. The resultant polyamide has an inherent viscosity of 0.7.

The polyamide is melt-spun at 280° C. into a 5-filament yarn of 180 total denier. The yarn on being drawn to 4 times its original length has a tenacity of 3.7 grams per denier and an extensibility of 45%.

EXAMPLE 4

A mixture of 35 parts of m-xylylene diammonium adipate, 0.8 part of m-xylylene diamine, 0.08 part of glacial acetic acid and 65 parts of water is pumped at a rate of 160 grams per minute into a narrow coiled tube fabricated in austenitic steel comprising 50 metres of internal diameter 7 mm. followed by ½ metre of internal diameter 9.5 mm., ½ metre of internal diameter 11.5 mm. and 18 metres of internal diameter 23 mm. The narrow coiled tube is maintained at 290° C., and has a pressure of 25 atmospheres at its inlet end. The exit end of the coil discharges a mixture of steam and polyamide into a chamber heated to 280° C. at atmospheric pressure from which the vapours pass to an efficient condensor. The polyamide, which collects at the bottom of the said chamber is pumped through a double extrusion head maintained at 280° C., so as to form two 34-filament yarns, each of 1000 total denier. The latter on being drawn to 5 times their original length exhibit a tenacity of 3.5 grams per denier and an extensibility of 20%.

EXAMPLE 5

A mixture of 30 parts of the salt derived from di-(beta-aminoethyl) mesitylene and adipic acid, 70 parts of water and 0.6 part of di-(beta-aminoethyl)mesitylene (i.e. free diamine) is pumped at a rate of 10 grams per minute into a narrow coiled tube of steel maintained at 300° C. and comprising 18 metres of internal diameter 2.3 mm. followed by ½ metre of internal diameter 4 mm. and 6 metres of internal diameter 8 mm. The pressure at the inlet-end of the tube is 20 atmospheres, and at the outlet end atmospheric. The resulting polyamide has an inherent viscosity of 0.7.

EXAMPLES 6–10

Examples 5 is repeated with the following monomers in place of the salt from di-(beta-aminoethyl) mesitylene and adipic acid.

| Example | Monomer |
|---|---|
| 6 | Salt from beta-(m-aminomethylphenyl)ethylamine and adipic acid. |
| 7 | Salt from p-di-(gamma-amino-n-propoxy)benzene and adipic acid. |
| 8 | Salt from di-(p-beta-aminoethylphenyl)methane and sebacic acid. |
| 9 | Amino acid: p-(gamma-amino-n-propyl)phenoxyacetic acid. |
| 10 | Amino acid: 1-p-(gamma-carboxy-n-propyl)phenyl-2-aminoethane. |

Particulars regarding Examples 6–10 are tabulated below:

| Example | Salt | Free diamine | Water | Rate of pumping, gms./min. | Temp. of tube, °C. | Pressure at inlet (atm.) | Inherent viscosity |
|---|---|---|---|---|---|---|---|
| 6 | 35 | 0.5 | 65 | 10 | 270 | 19 | |
| 7 | 35 | 0.6 | 65 | 11 | 280 | 24 | |
| 8 | 30 | ¹0.5 | 70 | 10 | 300 | 22 | 0.62 |
| 9 | 40 | ²0.1 | 60 | 10 | 280 | 22 | 0.6 |
| 10 | 35 | None | 65 | 10 | 280 | 22 | |

¹ Also 0.08 part of glacial acetic acid.
² Also 0.1 part of glacial acetic acid.

EXAMPLE 11

A mixture of 30 parts of the salt derived from decamethylene diamine and 1,2-di(p-beta-carboxyethylphenyl) ethane and 70 parts of water, to which has been added 0.8 part of decamethylene diamine is pumped at a rate of 10 grams per minute into a narrow coiled steel tube comprising 18 metres of internal diameter 2.3 mm. followed by ½ metre of internal diameter 4 mm. and 6 metres of internal diameter 8 mm. The narrow tube is maintained at 310° C. and the pressure at the inlet end is 24 atmospheres. The resulting polyamide at the outlet end is melt-spun into filaments at 275° C.

EXAMPLE 12

Example 11 is repeated with the substitution of the following reagents for those there given.

| | Parts |
|---|---|
| Salt derived from hexamethylene diamine and di-(p-carboxymethylphenyl) oxide | 35 |
| Water | 65 |
| Hexamethylene diamine | 0.6 |
| Glacial acetic acid | 0.1 |

The polyamide obtained has an inherent viscosity of 0.7.

EXAMPLE 13

A mixture of 40 parts of the salt derived from hexamethylene diamine and di-(p-carboxymethoxyphenyl) oxide, 60 parts of water and 0.6 part of hexamethylene diamine is pumped at a rate of 10 grams per minute into a narrow coiled steel tube comprising 18 metres of internal diameter 3 mm., followed by 7 metres of internal diameter 8 mm. The tube is maintained at 280° C. and the inlet pressure at the inlet end is 19 atmospheres and at the outlet atmospheric. The resulting polyamide has an inherent viscosity of 0.75 and may be melt-spun at 250° C. into filaments which on cold drawing afford a yarn of tenacity 3 grams per denier.

EXAMPLE 14

A mixture of 40 parts of the salt derived from hexamethylene diamine and beta-(p-carboxymethoxyphenyl)-propionic acid, 60 parts of water, 0.5 part of hexamethylene diamine (i.e. free diamine) and 0.06 part of acetic acid is pumped at a rate of 10 grams per minute into a narrow coiled steel tube, consisting of 18 metres of internal diameter 2.3 mm. followed by ½ metre of internal diameter 4 mm. and 7 metres of internal diameter 7 mm. The tube is maintained at 280° C., the pressure at the inlet end being 23 atmospheres.

The resulting polyamide has an inherent viscosity of 0.74.

The polyamide is moulded into a rod and melt-spun at 260° C. into a 5-filament yarn of 180 total denier. The yarn is drawn at a draw ratio of 4 and then exhibits a tenacity 3.5 grams per denier and an extensibility of 25%.

EXAMPLE 15

Example 14 is repeated except that instead of beta-(p-carboxymethoxyphenyl)-propionic acid, there is employed p-di-(carboxymethoxy)benzene, 0.6 part of the free diamine is used, and the coil is heated to 290° C.

The resulting polyamide has an inherent viscosity of 0.83 and is melt-spun at 255° C. into a 5-filament yarn of 180 total denier, which, after drawing, has a tenacity of 4.9 grams per denier and an extensibility of 16%.

EXAMPLE 16

Example 14 is repeated except that instead of beta-(p-carboxymethoxyphenyl) - propionic acid, there is employed 1,2-di - (p - carboxymethoxyphenyl)ethane, 0.7 part of the free diamine is used and the pressure at the inlet end of the tube is 22 atmospheres. The polyamide obtained has an inherent viscosity of 0.66.

EXAMPLE 17

A solution of 40 parts of nonamethylene diammonium terephthalate and 0.8 part of terephthalic acid in 60 parts of water at 95° C. is pumped at 10 grams per minute into a narrow coiled tube of steel comprising 18 metres of internal diameter 2.3 mm. followed by ½ metre of internal diameter 4 mm. and 6 metres of internal diameter 8 mm. The coil is maintained at a temperature of 340° C. and the pressure at its inlet end is 25 atmospheres.

The resulting polyamide has an inherent viscosity of 0.78. (in this case the solvent employed is pure dichloracetic instead of aqueous phenol as quoted in Example 1). It is moulded into a rod and melt-spun at 330° C. into a 5-filament yarn of 180 total denier, which after being drawn has a tenacity of 4.9 grams per denier and an extensibility of 9.6%.

EXAMPLE 18

Example 17 is repeated except that 35 parts of dodecamethylene diammonium terephthalate is used instead of the nonamethylene diammonium terephthalate and 65 parts of water. The salt forms a suspension at room temperature which is pumped into the narrow coiled tube at a rate of 11 grams per minute. The resulting polyamide has an inherent viscosity of 0.7 (in this case the solvent employed is pure dichloracetic instead of aqueous phenol as quoted in Example 1).

EXAMPLE 19

Example 17 is repeated except that the following reagents are employed:

| | Parts |
|---|---|
| Salt derived from 1,6-diamino-3-methyl-n-hexane and terephthalic acid | 35 |
| Water | 65 |
| 1,6-diamino-3-methyl-n-hexane | 0.5 |
| Glacial acetic acid | 0.3 |

The above solution is pumped into the narrow coiled steel tube, which is maintained at 320° C., at a rate of 9 grams per minute. The resulting polyamide has a Vicat softening point of 282° C. (The Vicat softening point is determined by a penetrometer similar to the apparatus described by Edgar and Ellery at page 2638 of the Journal of the Chemical Society, 1952.).

EXAMPLE 20

A polyamide having an inherent viscosity of 0.81 is made by pumping, at a rate of 10 grams per minute, the following mixture through a long narrow coiled steel tube maintained at 340° C. The mixture consists of:

| | Parts |
|---|---|
| Salt derived from hexamethylene diamine and p-di-(beta-carboxyethyl) benzene | 40 |
| Water | 60 |
| Hexamethylene diamine | 0.6 |
| Beta,beta-diphenylpropionic acid | 0.8 |

The coil consists of 18 metres of internal diameter 2.3 mm. followed by ½ metre of internal diameter 4 mm. and 7 metres of internal diameter 7 mm. The pressure at the inlet end of the coil is 23 atmospheres.

EXAMPLE 21

A polyamide having an inherent viscosity of 0.84 is made by pumping, at a rate of 20 grams per minute, the following mixture through a narrow coiled steel tube maintained at 280° C.

The mixture consists of:

| | Parts |
|---|---|
| Salt derived from hexamethylene diamine and p-di-(gamma-carboxy-n-propyl)benzene | 40 |
| Water | 60 |
| Hexamethylene diamine | 0.6 |
| Glacial acetic acid | 0.03 |

The coil consists of 25 metres of internal diameter 3.1 mm. followed by ½ metre of internal diameter 5 mm. and 12 metres of internal diameter 11 mm. The pressure at the inlet end of the coil is 27 atmospheres.

EXAMPLE 22

A mixture of 40 parts of the salt derived from hexamethylene diamine and p-(gamma-carboxy-n-propyl)phenylacetic acid, 60 parts of water, 0.6 part of the free diamine and 0.1 part of acetic acid is pumped at a rate of 11 grams per minute into a narrow coiled steel tube comprising 18 metres of internal diameter 2.3 mm. followed by ½ metre of internal diameter 4 mm. and 7 metres of internal diameter 7 mm. The tube is maintained at 275° C. and has a pressure at its inlet end of 22 atmospheres. The resulting polyamide has an inherent viscosity of 0.75.

EXAMPLE 23

A solution of 40 parts of hexamethylene diammonium isophthalate, 0.8 part of hexamethylene diamine and 0.06 part of glacial acetic acid in 60 parts of water at 85° C. is pumped at a rate of 18 grams per minute into a narrow coiled steel tube comprising 25 metres of internal diameter 3.1 mm. followed by ½ metre of internal diameter 5 mm. and 12 metres of internal diameter 11 mm. The temperature of the tube is 310° C. and the pressure at its inlet end 27 atmospheres. The resulting polyamide has an inherent viscosity of 0.5.

EXAMPLE 24

A mixture of 40 parts of the salt derived from hexamethylene diamine and di-(m-carboxyphenyl)methane, 60 parts of water, 0.7 part of hexamethylene diamine (i.e. free diamine) and 0.06 part of glacial acetic acid is pumped at a rate of 10 grams per minute through a steel tube consisting of 18 metres of internal diameter 2.3 mm. followed by ½ metre of internal diameter 4 mm. and 7 metres of internal diameter 7 mm. The tube is maintained at 300° C. and the pressure at its inlet end is 23 atmospheres. The resulting polyamide has an inherent viscosity of 0.6.

EXAMPLES 25 AND 26

Example 24 is repeated except that the salts are derived from:

| Example: | |
|---|---|
| 25 | p-Di(gamma-amino-n-propyl) benzene and p-di(beta-carboxyethyl) benzene. |
| 26 | p-Di(gamma-amino-n-propyl) benzene and p-di(carboxymethyl) benzene. |

The other date respecting Examples 25 and 26 are tabulated below:

| Ex. | Parts of— | | | | Rate of pumping, gms./min. | Temp. of tube, °C. | Pressure at inlet (atm.) | Inherent viscosity |
|---|---|---|---|---|---|---|---|---|
| | Salt | Acetic acid | Free diamine | Water | | | | |
| 25 | 40 | 0.05 | 0.6 | 60 | 10 | 300 | 24 | 0.69 |
| 26 | 40 | 0.13 | 0.6 | 60 | 10 | 290 | 22 | 0.7 |

EXAMPLE 27

| | Parts |
|---|---|
| Hexamethylene diammonium adipate | 32 |
| Hexamethylene diammonium terephthalate | 8 |
| Hexamethylene diamine | 0.4 |
| Hexamethylene diamine | 0.4 |
| Glacial acetic acid | 0.1 |
| Titanium dioxide | 0.7 |
| Manganese acetate | 0.0035 |
| Sodium hexametaphosphate | 0.008 | in 60 parts of water is pumped at a rate of 160 grams per minute into a coiled steel tube comprising 50 metres of internal diameter 7 mm. followed by ½ metre of internal diameter 9.5 mm., ½ metre internal diameter 11.5 mm. and 18 metres of internal diameter 23 mm. The coiled tube is maintained at 300° C. The pressure at its inlet end is 23 atmospheres. The exit end of the coil discharges a mixture of steam and interpolyamide into a chamber heated to 300° C. from which the vapours pass to an efficient condensor. The interpolyamide, which collects at the bottom of the heated chamber, is melt-spun at 300° C. into two yarns each of 1,000 denier and 34 filaments. The latter are drawn over a plate at 160° C. at a draw ratio of 5.3 giving yarn with a tenacity of 6.1 grams per denier.

EXAMPLE 28

There is pumped through a coiled steel tube at 290° C. at a rate of 20 grams per minute, the following mixture:

| | Parts |
|---|---|
| Nonamethylene diammonium terephthalate | 24 |
| Nonamethylene diammonium adipate | 16 |
| Water | 60 |
| Nonamethylene diamine | 0.6 |
| Terephthalic acid | 0.7 |

The steel tube consists of 25 metres of internal diameter 3 mm. followed by 10 metres of internal diameter 5 mm. and 9.5 metres of internal diameter 9 mm. The resulting interpolyamide has an inherent viscosity of 0.78 (in this case the solvent employed is pure dichloracetic acid instead of aqueous phenol as quoted in Example 1).

The interpolyamide is moulded into a rod and melt-spun at 285° C. into a 5-filament yarn of 180 total denier. The yarn is drawn to 4.5 times its original length over a pin heated to 100° C. followed by a hot plate maintained at 160° C. The yarn obtained has a tenacity of 4.8 grams per denier.

EXAMPLE 29

A mixture of:

| | Parts |
|---|---|
| Nonamethylene diammonium terephthalate | 32 |
| Hexamethylene diammonium adipate | 8 |
| Nonamethylene diamine | 0.5 |
| Hexamethylene diamine | 0.1 |
| Terephthalic acid | 0.7 |
| Water | 60 | is pumped at a rate of 160 grams per minute into a narrow coiled steel tube comprising 50 metres of internal diameter 7 mm. followed by 5 metres of internal diameter 9.5 mm., 10 metres of internal diameter 11.5 mm. and 18 metres of internal diameter 23 mm. The narrow coiled tube is maintained at 308° C. The pressure at its inlet end is 28 atmospheres. The exit end of the coil discharges a mixture of steam and interpolyamide into a chamber heated to 300° C. from which the vapours pass to an efficient condensor. The interpolyamide, which collects at the bottom of the heated chamber is extruded at 300° C. in the form of two yarns each of 1000 denier and 34 filaments. These yarns are drawn over a pin heated to 100° C. to 5.1 times their original length giving yarn with a tenacity of 5.2 grams per denier and an initial modulus of 46 grams per denier per 100% extension.

EXAMPLE 30

A mixture of the following reagents is pumped at a rate of 10 grams per minute into a coiled steel tube having a pressure of 29 atmospheres at its inlet end and maintained at 325° C.

Reagents

| | Parts |
|---|---|
| Salt derived from hexamethylene diamine and p-di(beta-carboxyethyl)benzene | 40 |
| Epsilon-aminocaproic acid | 5 |
| Hexamethylene diamine | 0.6 |
| Acetic acid | 0.03 |
| Water | 55 |

The tube consists of 18 metres of internal diameter 2.5 mm. followed by 5 metres of internal diameter 5 mm. and 6 metres of internal diameter 8 mm.

The resulting polyamide has an inherent viscosity of 0.66 (determined in pure dichloracetic acid instead of aqueous phenol as specified in Example 1).

The polyamide is melt-spun into yarn which on drawing to 5.1 times its original length over a pin at 150° C. has a tenacity of 4.8 grams per denier and an extensibility of 14%.

EXAMPLE 31

Example 30 is repeated except that the following reagents are employed and the pressure at the inlet end of the tube is 28 atmospheres.

Reagents

| | Parts |
|---|---|
| Salt derived from hexamethylene diamine and p-di(beta-carboxyethyl) benzene | 35 |
| Hexamethylene diammonium sebacate | 83 |
| Hexamethylene diamine | 0.6 |
| Glacial acetic acid | 0.05 |
| Water | 57 |

The resulting polyamide has an inherent viscosity of 0.8 (measured in dichloroacetic acid instead of the aqueous phenol specified in Example 1).

EXAMPLE 32

Example 30 is repeated with the following reagents, the temperature of the tube being 300° C. and the pressure at its inlet end 27 atmospheres.

Reagents

| | Parts |
|---|---|
| Hexamethylene diammonium isophthalate | 24 |
| Hexamethylene diammonium terephthalate | 16 |
| Hexamethylene diamine | 0.5 |
| Water | 60 |

EXAMPLE 33

A mixture of the following reagents is pumped at a rate of 160 grams per minute into a steel tube comprising 50 metres of internal diameter 7 mm. followed by ½ metre of internal diameter 9.5 mm., ½ metre of internal diameter 11.5 mm. and finally 18 metres of internal diameter 23 mm. The tube is maintained at 300° C. and the pressure at its inlet end is 28 atmospheres.

Reagents

| | Parts |
|---|---|
| Hexamethylene diammonium terephthalate | 32 |
| Epsilon-amino-caproic acid | 9 |
| Hexamethylene diamine | 0.5 |
| Glacial acetic acid | 0.03 |
| Water | 59 |

The polyamide is melt-spun at 300° C. into filaments which on being drawn possess a tenacity of 3.4 grams per denier and an extensibility of 14%.

EXAMPLE 34

Example 33 is repeated except that the following reagents are used, the temperature of the tube being 288° C. the pressure at its inlet end 25 atmospheres and the rate of pumping 140 grams per minute.

Reagents

| | Parts |
|---|---|
| Hexamethylene diammonium adipate | 20 |
| Hexamethylene diammonium terephthalate | 12.7 |
| Hexamethylene diammonium isophthalate | 8.3 |
| Hexamethylene diamine | 0.5 |
| Glacial acetic acid | 0.03 |
| Water | 60 |

The resulting polyamide is melt-spun at 288° C. into yarn possessing, after being drawn, a tenacity of 3.6 grams per denier.

EXAMPLE 35

A mixture of 35 parts of m-xylylene diammonium adipate, 0.07 part of acetic acid and 65 parts of water is pumped at a rate of 440 grams per hour into a narrow coiled tube fabricated in austenitic steel comprising 15 metres of internal diameter 2.3 mm. followed by 7.5 metres of internal diameter 5.8 mm. The narrow coiled tube is maintained at 290° C. and has a pressure of 14.5 atmospheres at its inlet end. The exit end of the coil discharges a mixture of steam and polyamide into a chamber heated to 290° C. at atmospheric pressure from which the vapours pass to an efficient condensor. The polyamide is extruded as a ribbon from the bottom of the said chamber and is quenched in cold water. The resulting polyamide ribbon is cut into chips. The polyamide has an inherent viscosity of 0.64 when m-cresol is used as solvent in place of the 90% aqueous phenol referred to in the penultimate paragraph of Example 1.

The polyamide is melt-spun at 275° C. into a 5-filament yarn of 175 total denier. The yarn on being drawn to 5 times its original length over a pin at 80° C. has a tenacity of 1.75 grams per denier, an extensibility of 17% and an initial modulus of 0.39 gm. per denier at 1% extension.

EXAMPLE 36

Example 35 is repeated with the substitution of the following reagents and conditions for those there given.

Reagents

| | Parts |
|---|---|
| Hexamethylene diammonium beta-(p-carboxymephenyl)-propionate | 35 |
| Water | 65 |
| Hexamethylene diamine | 0.6 |
| Glacial acetic acid | 0.06 |

Conditions

The mixture of reagents is pumped into the tube at 440 grams per hour, the temperature of the tube being 280° C. and the pressure at its inlet end 21 atmospheres.

The resulting polyamide has an inherent viscosity of 0.56.

EXAMPLE 37

Example 35 is repeated with the substitution of the following reagents and conditions for those there given.

Reagents

| | Parts |
|---|---|
| Hexamethylene diammonium isophthalate | 40 |
| Water | 60 |

Conditions

The mixture of reagents is pumped into the tube at 430 grams per hour, the temperature of the tube being 310° C. and the pressure at the inlet end thereof 22 atmospheres.

The resulting polyamide has an inherent viscosity of 0.54.

EXAMPLE 38

Example 35 is repeated with the substitution of the following reagents and conditions for those there given.

Reagents

| | Parts |
|---|---|
| Nonamethylene diammonium terephthalate acid | 40 |
| Water | 65 |
| Terephthalic acid | 0.82 |

Conditions

The mixture of reagents, which is kept hot by means of a steam jacket, is pumped into the tube at 320 grams per hour, the temperature of the tube being 340° C. and the pressure at its inlet end 23 atmospheres.

The inherent viscosity of the resulting polyamides, determined in the manner described in Example 1 but with the use of a solution of 5% weight by volume lithium chloride in dimethylacetamide as solvent instead of 90% aqueous phenol, is 1.08.

EXAMPLE 39

A mixture of 32 parts of hexamethylene diammonium adipate, 8 parts of hexamethylene diammonium isophthalate, 0.6 part of hexamethylene diamine and 60 parts of water is pumped at a rate of 460 grams per hour into a narrow coiled tube fabricated in austenitic steel comprising 15 metres of internal diameter 2.3 mm. followed by 7.5 metres of internal diameter 5.8 mm. The narrow coiled tube is maintained at 300° C. and has a pressure of 30 atmospheres at its inlet end. The resultant copolyamide has an inherent viscosity of 0.75. The copolyamide is melt-spun at 270° C. into a 5-filament yarn of 180 total denier. The yarn is drawn at a draw ratio of 4.25 over a pin at 100° C. and then exhibits a tenacity of 3.3 grams per denier, an extensibility of 41% and an initial modulus of 0.23 gram per denier at 1% extension.

EXAMPLE 40

Example 39 is repeated except that meta-xylylene diammonium adipate is employed instead of hexamethylene diammonium isophthalate. The coil is maintained at 290° C. and the pressure at the inlet end is 33 atmospheres. The resulting copolyamide has an inherent viscosity of 0.72.

This copolyamide is melt-spun at 280° C. into a 5-filament yarn of 180 total denier. The yarn drawn at a ratio of 5.75 over a pin heated to 150° C. exhibits a tenacity of 5.4 grams per denier, an extensibility of 15% and an initial modulus of 0.25 gram per denier at 1% extension.

We claim:

1. A continuous process for the manufacture of high molecular weight linear polyamides by the condensation polymerization of diammonium dicarboxylate salt a diamine of formula $H_2NCH_2$—X—$CH_2NH_2$ and a dicarboxylic acid of formula HOOC—Y—COOH, X designating a chain of p-2 methylene groups containing $q$ meta and para phenylene links and Y a meta or para phenylene link wherein $p$ is a positive integer $q$ is zero, 1 or 2, $p$ is at least 6 if $q$ is zero but at least 2 if $q$ is greater than zero provided that when $q$ is zero, $p$ is at least 9 when the methylene groups in X are not alkyl substituted and Y does not contain a meta phenylene group, X and Y optionally bearing alkyl substituents and X optionally containing —O— links in the chain, providing the groupings —O—O—, —O—$CH_2$—N= and O—$CH_2$—$CH_2$—CO— be absent, which process comprises pumping a mixture of water and said monomer into the entry end of a long tube which has an internal diameter not exceeding 3.5 cm. and is heated to polymerization temperatures at least 10° C. above the melting point of the polyamide which causes the material to polymerize as it passes through the tube, wherein the pressure is at least 14 atmospheres at the entry end of said tube, continuously decreases along the tube, and is at the most substantially atmospheric at the exit end of said tube but always permits the evolution of steam and at any point in the tube has a value constituting a continuous monotonic single-value function of the distance of said point along the tube, the period of passage of the polymerizing material through the tube being sufficient to cause at least 90% of the total theoretical water of chemical condensation to be evolved during said passage, and optionally further heating the material issuing from the exit end of the tube to complete the polymerization of the polyamide.

2. The process of claim 1, wherein the temperature of the polymerizing material does not fall as it passes from the entry end to the exit end of the tube.

3. The process of claim 1, wherein the whole of the tube is at one uniform polymerization temperature.

4. The process of claim 1, wherein the diamine is chosen from the group consisting of
p-Xylylene diamine
m-Xylylene diamine
2,5-di(beta-aminoethyl)-p-xylene
di-(beta-aminoethyl)durene
m-Di(beta-aminoethyl) benzene
p-Methyl-m-xylene diamine
Di-(aminomethyl) mesitylene
Di-(aminoethyl) mesitylene
1,3-dimethyl-4,6-xylylene diamine.

5. The process of claim 1, wherein the polymerizing material is submitted to polymerizing temperatures for a period of from 30 to 60 minutes, the long tube has an internal diameter not exceeding 2.5 cm., and the pressure at the entry end of the long tube is between 20 and 34 atmospheres.

References Cited
UNITED STATES PATENTS

| 2,742,496 | 4/1956 | Lum et al. | 260—78 |
| 2,752,328 | 6/1956 | Magat | 260—78 |
| 2,831,834 | 4/1958 | Magat | 260—78 |
| 3,164,630 | 1/1965 | Pietrusza | 260—78 |
| 3,193,535 | 7/1965 | Carter | 260—78 |
| 3,206,438 | 9/1965 | Jameson | 260—78 |

FOREIGN PATENTS

| 610,264 | 10/1948 | Great Britain. |
| 627,733 | 8/1948 | Great Britain. |
| 797,617 | 7/1958 | Great Britain. |
| 825,096 | 12/1959 | Great Britain. |
| 861,866 | 3/1961 | Great Britain. |

HAROLD D. ANDERSON, Primary Examiner

U.S. Cl. X.R.

260—95